(12) United States Patent
Bojar et al.

(10) Patent No.: US 12,056,457 B2
(45) Date of Patent: Aug. 6, 2024

(54) COMPUTER-IMPLEMENTED METHOD OF REAL TIME SPEECH TRANSLATION AND A COMPUTER SYSTEM FOR CARRYING OUT THE METHOD

(71) Applicant: Charles University, Faculty Of Mathematics And Physics, Prague (CZ)

(72) Inventors: Ondrej Bojar, Prague (CZ); Dominik Machacek, Rudoltice (CZ)

(73) Assignee: Charles University, Faculty Of Mathematics And Physics, Prague (CZ)

(*) Notice: Subject to any disclaimer, the term of this patent is extended or adjusted under 35 U.S.C. 154(b) by 276 days.

(21) Appl. No.: 17/701,600

(22) Filed: Mar. 22, 2022

(65) Prior Publication Data

US 2023/0306207 A1    Sep. 28, 2023

(51) Int. Cl.
G06F 40/58    (2020.01)
G06V 20/40    (2022.01)
(Continued)

(52) U.S. Cl.
CPC .............. G06F 40/58 (2020.01); G06V 20/41 (2022.01); G10L 15/19 (2013.01); G10L 15/22 (2013.01)

(58) Field of Classification Search
CPC .... G06F 3/167; G06F 18/2148; G06F 40/205; G06F 40/30; G06F 40/42; G06F 40/47; G06F 40/51; G06F 40/58; G06F 3/0481; G06F 9/451; G06F 15/00; G06F 16/24522; G06F 16/3344; G06F 16/9535; G06F 16/9537; G06F 40/268; G06F 40/35; G06V 20/41; G06V 40/28; G10L 13/00; G10L 15/005; G10L 15/19; G10L 15/22; G10L 15/24; G10L 15/26; G10L 15/32; G10L 25/60; G10L 25/48; G10L 25/51;
(Continued)

(56) References Cited

U.S. PATENT DOCUMENTS 5,752,227 A * 5/1998 Lyberg ................ G10L 15/1807
704/235
6,009,398 A * 12/1999 Mueller ............... G06Q 10/109
704/275
(Continued)

FOREIGN PATENT DOCUMENTS

EP    3467821 A1    4/2019

OTHER PUBLICATIONS

Ondrej Bojar et al., Operating a Complex SLT System with Speakers and Human Interpreters, Proceedings of the 18th Biennial Machine Translation Summit, Virtual USA, Aug. 16-20, 2021.
(Continued)

*Primary Examiner* — Gerald Gauthier
(74) *Attorney, Agent, or Firm* — Thedford I. Hitaffer; Hitaffer & Hitaffer, PLLC

(57) ABSTRACT

A computer-implemented method of real time speech translation wherein at least a source speech and a human interpretation of the source speech are transcribed using an automatic speech recognition system and machine translated into a common language. A best source of data is then selected repeatedly and data from the best source are machine translated into at least one another language.

10 Claims, 3 Drawing Sheets

(51) Int. Cl.
*G10L 15/19* (2013.01)
*G10L 15/22* (2006.01)

(58) Field of Classification Search
CPC ....... G10L 15/063; G10L 15/08; G10L 15/16; G10L 15/18; G10L 15/1807; G10L 15/1822; G10L 15/183; G10L 15/28; G10L 15/30; H04H 20/61; H04M 3/42348; H04M 3/56; H04M 3/565; H04N 7/147; H04N 1/00488; H04N 21/42203; H04N 21/4882; G01C 21/3608; G06K 7/1413; G06N 3/004; G06N 3/045; G06Q 10/10; G06Q 10/109; G06Q 20/14; G06Q 40/02; G06T 7/20; G06T 19/006; G08G 5/0013; G08G 5/065; G11B 20/1052; G16H 15/00; G16H 40/67; G16H 50/20; G16H 50/70; H04L 51/10; H04L 67/306; H04L 67/56

See application file for complete search history.

(56) References Cited

U.S. PATENT DOCUMENTS

| | | | | |
|---|---|---|---|---|
| 6,377,296 | B1* | 4/2002 | Zlatsin | G06T 7/20 |
| | | | | 707/E17.026 |
| 6,477,437 | B1* | 11/2002 | Hirota | G06Q 10/10 |
| | | | | 700/95 |
| 7,421,393 | B1* | 9/2008 | Di Fabbrizio | G10L 15/28 |
| | | | | 379/88.04 |
| 7,430,510 | B1* | 9/2008 | De Fabbrizio | G10L 15/22 |
| | | | | 379/88.04 |
| 8,818,795 | B1* | 8/2014 | Cassimatis | G06F 40/30 |
| | | | | 704/9 |
| 9,836,457 | B2* | 12/2017 | Fujiwara | G06F 40/51 |
| 10,234,303 | B1* | 3/2019 | Chandrashekarappa | |
| | | | | G08G 5/065 |
| 10,714,081 | B1* | 7/2020 | Miller | G10L 15/08 |
| 10,896,298 | B2* | 1/2021 | Weber | H04N 7/147 |
| 11,087,087 | B1* | 8/2021 | Mayer | G06F 40/30 |
| 11,442,608 | B1* | 9/2022 | Barros | G06F 3/0481 |
| 11,580,982 | B1* | 2/2023 | Karnawat | G10L 15/22 |
| 11,687,576 | B1* | 6/2023 | Katz | H04N 21/4882 |
| | | | | 715/254 |
| 11,776,542 | B1* | 10/2023 | Bueche | G10L 15/1822 |
| | | | | 704/231 |
| 11,783,824 | B1* | 10/2023 | Mars | G10L 15/18 |
| | | | | 704/270 |
| 11,848,011 | B1* | 12/2023 | Fantinuoli | G06F 40/205 |
| 11,978,445 | B1* | 5/2024 | Bueche | G10L 15/22 |
| 11,995,416 | B2* | 5/2024 | Ishikawa | G06F 40/268 |
| 2002/0129010 | A1* | 9/2002 | Fung | G06F 16/24522 |
| 2002/0178005 | A1* | 11/2002 | Dusan | G06F 40/30 |
| | | | | 704/254 |
| 2003/0046689 | A1* | 3/2003 | Gaos | H04N 21/42203 |
| | | | | 715/745 |
| 2003/0189603 | A1* | 10/2003 | Goyal | G10L 15/22 |
| | | | | 704/E15.04 |
| 2004/0092293 | A1* | 5/2004 | Lee | G10L 15/26 |
| | | | | 704/E15.045 |
| 2004/0208190 | A1* | 10/2004 | Wagener | H04L 67/56 |
| | | | | 370/466 |
| 2005/0075874 | A1* | 4/2005 | Balchandran | G06F 40/30 |
| | | | | 704/231 |
| 2006/0112349 | A1* | 5/2006 | Clow | G06F 9/451 |
| | | | | 715/780 |
| 2006/0123159 | A1* | 6/2006 | Clow | G06F 3/0481 |
| | | | | 710/48 |
| 2006/0224961 | A1* | 10/2006 | Omi | H04N 1/00488 |
| | | | | 715/700 |
| 2006/0271350 | A1* | 11/2006 | Chino | G06F 40/268 |
| | | | | 704/2 |
| 2006/0293894 | A1* | 12/2006 | Peyroux | G10L 15/183 |
| | | | | 704/E15.044 |
| 2007/0043553 | A1* | 2/2007 | Dolan | G06F 40/47 |
| | | | | 704/2 |
| 2007/0050306 | A1* | 3/2007 | McQueen | G06Q 20/14 |
| | | | | 705/77 |
| 2007/0143398 | A1* | 6/2007 | Graham | G06Q 40/02 |
| | | | | 709/204 |
| 2008/0077387 | A1* | 3/2008 | Ariu | G10L 15/22 |
| | | | | 704/E15.04 |
| 2008/0184164 | A1* | 7/2008 | Di Fabbrizio | G10L 15/22 |
| | | | | 704/E15.04 |
| 2008/0243777 | A1* | 10/2008 | Stewart | G06F 16/3344 |
| 2010/0070554 | A1* | 3/2010 | Richardson | H04L 67/306 |
| | | | | 709/202 |
| 2011/0010174 | A1* | 1/2011 | Longe | G10L 15/32 |
| | | | | 704/235 |
| 2011/0321008 | A1* | 12/2011 | Jhoney | G06F 3/167 |
| | | | | 704/235 |
| 2012/0035932 | A1* | 2/2012 | Jitkoff | G01C 21/3608 |
| | | | | 704/254 |
| 2013/0006616 | A1* | 1/2013 | Wakaki | G06F 16/9537 |
| | | | | 704/200 |
| 2013/0030804 | A1* | 1/2013 | Zavaliagkos | G10L 15/24 |
| | | | | 704/235 |
| 2013/0297285 | A1* | 11/2013 | Kwon | G06F 40/58 |
| | | | | 704/2 |
| 2014/0081617 | A1* | 3/2014 | Carter | G10L 15/32 |
| | | | | 704/2 |
| 2014/0297257 | A1* | 10/2014 | Shin | G06F 3/167 |
| | | | | 704/3 |
| 2014/0365200 | A1* | 12/2014 | Sagie | G06F 40/51 |
| | | | | 704/2 |
| 2015/0032443 | A1* | 1/2015 | Karov | G06F 40/35 |
| | | | | 704/9 |
| 2015/0120723 | A1* | 4/2015 | Deshmukh | G06F 16/9535 |
| | | | | 707/734 |
| 2015/0134320 | A1* | 5/2015 | Rangarajan Sridhar | |
| | | | | G10L 15/005 |
| | | | | 704/2 |
| 2015/0287043 | A1* | 10/2015 | Michaelis | G16H 50/20 |
| | | | | 705/317 |
| 2016/0162475 | A1* | 6/2016 | Bondarenko | G10L 15/22 |
| | | | | 704/9 |
| 2016/0163311 | A1* | 6/2016 | Crook | G10L 15/183 |
| | | | | 704/275 |
| 2016/0277585 | A1* | 9/2016 | Efrati | H04M 3/565 |
| 2017/0019362 | A1* | 1/2017 | Kim | H04L 51/10 |
| 2017/0039473 | A1* | 2/2017 | Starrett, Jr. | G06N 3/004 |
| 2017/0236450 | A1* | 8/2017 | Jung | G06F 3/167 |
| | | | | 704/3 |
| 2017/0242847 | A1* | 8/2017 | Li | G06F 40/42 |
| 2018/0246882 | A1* | 8/2018 | Pazhoor | H04H 20/61 |
| 2019/0027149 | A1* | 1/2019 | Vogel | G16H 15/00 |
| 2019/0057690 | A1* | 2/2019 | Fry | G10L 15/32 |
| 2019/0057692 | A1* | 2/2019 | Fry | G10L 15/22 |
| 2019/0057693 | A1* | 2/2019 | Fry | G10L 15/26 |
| 2019/0147858 | A1* | 5/2019 | Letsu-Dake | G10L 15/063 |
| | | | | 704/275 |
| 2019/0149404 | A1* | 5/2019 | Toews | G06F 15/00 |
| | | | | 709/220 |
| 2019/0311638 | A1* | 10/2019 | Srinivasan | G08G 5/0013 |
| 2019/0332679 | A1* | 10/2019 | Kristjansson | H04M 3/56 |
| 2019/0354592 | A1* | 11/2019 | Musham | G10L 13/00 |
| 2020/0192982 | A1* | 6/2020 | Luqman | G06F 40/30 |
| 2020/0210772 | A1* | 7/2020 | Bojar | G06F 18/2148 |
| 2020/0304708 | A1* | 9/2020 | Lee | G11B 20/10527 |
| 2020/0335193 | A1* | 10/2020 | Zaker | G06K 7/1413 |
| 2020/0349976 | A1* | 11/2020 | Wiggeshoff | G10L 15/16 |
| 2021/0151053 | A1* | 5/2021 | Takahashi | G10L 15/22 |
| 2021/0152700 | A1* | 5/2021 | Matsumura | G10L 15/1822 |
| 2021/0271826 | A1* | 9/2021 | Wang | G10L 15/005 |
| 2021/0272585 | A1* | 9/2021 | Han | G16H 50/70 |
| 2021/0385328 | A1* | 12/2021 | Gu | H04M 3/42348 |
| 2022/0005263 | A1* | 1/2022 | Gupta | G06T 19/006 |
| 2022/0092274 | A1* | 3/2022 | Arivazhagan | G06F 40/47 |
| 2022/0129643 | A1* | 4/2022 | Seo | G06N 3/045 |
| 2022/0246132 | A1* | 8/2022 | Zhang | G10L 15/063 |
| 2022/0310074 | A1* | 9/2022 | Audhkhasi | G10L 15/26 |

(56) References Cited

U.S. PATENT DOCUMENTS

| | | | |
|---|---|---|---|
| 2022/0310096 A1* | 9/2022 | Choi ........................ | G10L 25/51 |
| 2023/0019737 A1* | 1/2023 | Barros ..................... | G10L 15/08 |
| 2023/0089902 A1* | 3/2023 | Arkhangorodsky .... | G06F 40/58 |
| | | | 704/277 |
| 2023/0111618 A1* | 4/2023 | Sharifi ..................... | G10L 15/30 |
| | | | 704/235 |
| 2023/0306207 A1* | 9/2023 | Bojar ....................... | G06F 40/58 |
| 2024/0086649 A1* | 3/2024 | Fridman ................. | G16H 40/67 |

OTHER PUBLICATIONS

Awni Hannun et al., Deep Speech: Scaling up end-to-end speech recognition, Baidu Research—Silicon Valley AI Lab, Dec. 19, 2014.
Marcin Junczys-Dowmunt et al., Marian: Fast Neural Machine Translation in C++, Microsoft, Adam Mickiewicz University in Poznan and University of Edinburgh Unbabel, Apr. 4, 2018.
Thai-Son Nguyen et al., Super-Human Performance in Online Low-latency Recognition of Conversational Speech, Institute for Anthropomatics and Robotics, Karlsruhe Institute of Technology and Karlsruhe Information Technology Solutions—kites GmbH, Jul. 26, 2021.
Ngoc-Quan Pham et al., The IWSLT 2019 KIT Speech Translation System, Institute for Anthropomatics and Robotics KIT—Karlsruhe Institute of Technology, Germany, Department of Data Science University of Maastricht, Netherlands and Language Technologies Institute Carnegie Mellon University. 2019.
Ashish Vaswani et al., Attention Is All You Need, 31st Conference on Neural Information Processing Systems (NIPS 2017), Long Beach, CA, USA.

\* cited by examiner

COMPUTER-IMPLEMENTED METHOD OF REAL TIME SPEECH TRANSLATION AND A COMPUTER SYSTEM FOR CARRYING OUT THE METHOD

BACKGROUND OF THE INVENTION

The present invention relates to the field of machine speech recognition and machine translation, in particular to a method of real time translation from speech to text using as an input a source speech and its human real time interpretation.

Current systems and methods for real time speech translation generally implement an automatic speech recognition (ASR) to obtain a transcript of the speech in the source language followed by a machine translation (MT) of the transcript. Downsides of this general approach are mainly in a low quality of the resulting translation caused by errors made by ASR, which then naturally lead to errors in translation, by errors made by MT, by noise in the source audio data etc.

ASR and MT systems usually implement neural network algorithms, and countless such algorithms are known in the art. Exemplary architecture for an ASR system that can be used for such an application is disclosed in article "Superhuman performance in online low-latency recognition of conversational speech" by Nguyen, T.-S., Stueker, S., and Waibel, A. ((2020c). arXiv preprint arXiv:2010.03449). Another known ASR is for example DeepSpeech speech-to-text engine using techniques based on article named "Deep Speech: Scaling up end-to-end speech recognition" by Hannun, A. Y., Case, C., Casper, J., Catanzaro, B., Diamos, G. F., Elsen, E., Prenger, R. J., Satheesh, S., Sengupta, S., Coates, A., & Ng, A. ((2014). ArXiv, abs/1412.5567).

Exemplary architecture for an MT system is described in article "Attention is all you need. Advances in Neural Information Processing Systems" by Vaswani, A., Shazeer, N., Parmar, N., Uszkoreit, J., Jones, L., Gomez, A. N., Kaiser, L., and Polosukhin, I. ((2017)., 30:5998-6008), and in article "The iwslt 2019 kit speech translation system" by Pham, N.-Q., Nguyen, T.-S., Ha, T.-L., Hussain, J., Schneider, F., Niehues, J., Stüker, S., and Waibel, A. ((2019). In Proceedings of IWSLT 2019). An implementation of MT algorithms that can be used is for example the Marian framework described in "Marian: Fast Neural Machine Translation in C++" by Junczys-Dowmunt, M., Grundkiewicz, R., Dwojak, T., Hoang, H. T., Heafield, K., Neckermann, T., Seide, F., Germann, U., Aji, A. F., Bogoychev, N., Martins, A. F., & Birch, A. ((2018). ACL).

The quality of the resulting translation can be improved by using multiple parallel language sources. Such an approach is described in article "Operating a Complex SLT System with Speakers and Human Interpreters" by Ondřej Bojar, Vojtěch Srdečný, Rishu Kumar, Otakar Smrž, Felix Schneider, Barry Haddow, Phil Williams, and Chiara Canton. (2021. In Proceedings of the 1st Workshop on Automatic Spoken Language Translation in Real-World Settings (ASLTRW), pages 23-34, Virtual. Association for Machine Translation in the Americas). In this document, machine-translated transcripts of human interpretation of the source speech are used together with a transcript of the source speech to provide multiple sources of text to choose from for machine translation into another languages. The best source used for the final translations at any given moment is however chosen by a human operator which significantly complicates the whole method and decreases the speed and accuracy with which the best source can be chosen.

A method for combining several sources into a better-quality translation or transcript is disclosed in document EP3467821 A1. This method cannot however overcome errors in the audio input data and the quality improvement, especially for real time translating, is limited.

It is therefore the aim of this invention to provide an improved method for real time speech translation where errors made by individual ASR or MT systems have less impact on the final translation and where a human operator is not necessary for providing accurate translation results.

SUMMARY OF THE INVENTION

The above-mentioned drawback are eliminated by a computer-implemented method of real time speech translation comprising the following steps:
  Receiving, in real time, input data comprising a source speech in a source language.
  Receiving, in real time, interpretation data comprising a real time human interpretation of the source speech into at least one interpretation language different from the source language. Generally, human interpreters are present at the same place as the source speaker, in sound-proof booths. They receive the source speech via headphones and provide their interpretations to their own audience and/or to a microphone for recording. It's also possible to use remote interpreters, e.g., receiving the source speech online.
  Transcribing, in real time, at least part of the input data and interpretation data into text data using at least one automatic speech recognition (ASR) system. Any system that can receive a speech and output text can be used as an ASR system. Different systems can be used for different languages; it is also possible to use the same system trained on different datasets for different languages or use a single system capable of transcribing in multiple languages.
  Translating, in real time, the text data into one common language using at least one machine translation (MT) system. Preferably, the source language is the one common language, so that the source speech transcript is not passed through any MT system that might introduce additional errors to the transcript. For some source languages, however, it may be advantageous to use one of the interpretation languages as the common language, or to use an altogether different language as the common language.
  Selecting repeatedly, based at least partially on the transcribed input data and the transcribed interpretation data translated into the common language, a currently most credible source of text data. A source in this step is selected from a group comprising the MT system(s) (possibly comprising or being preceded by an ASR system) and possibly also any ASR than provides text in the one common language without need for translation. The currently most credible source is selected from this group, so it might be one of the at least one machine translation systems or one of the at least one speech recognition systems providing text data in the common language. In some embodiments it may also be a source providing audio data not being processed by ASR or MT. A combination of ASR and MT system receiving the source/interpreted speech and outputting text in the common language can also be considered a source or the currently most credible source.

Feeding data from the currently most credible source into at least one machine translation system for real time final translation into at least one language different from the source language and from the at least one interpretation language. Thus, as a result of the presented method, a translation into a language for which no human interpreter is available is provided and its quality is expected to be better compared to simply translating the source speech or its transcript into this language with a known machine translation system.

Obtaining the final translations. This step may also involve providing the final translations to users, preferably also in real time, e.g., in the form of subtitles.

In the step of selecting, inactive sources that have not provided any text data in a predetermined time period are ruled out from the current selection, and current automatic credibility score of each of the remaining sources is determined based on outputs provided by each source in last N seconds. The source with the best automatic credibility score is then selected as the currently most credible source. The best score is especially either highest or lowest score, depending on how the score is defined.

Preferably all the input and interpretation data are transcribed, or speech in some language(s) is not transcribed and is provided to the selection step in form of audio data, while speech in other language(s) is transcribed and potentially machine translated before being sent to selection. Speech in this context can be both the source speech and the human interpretation. The group of sources for selection thus comprises at least one text source and one other source which may also be a text source but may be in a different kind of format, e.g., audio.

The method has the following advantageous effects, especially as a result of the selecting step having multiple sources, some based on human interpretation, and repeatedly, preferably as often as possible, choosing the best one. Failure in recording of the source speech or one of the interpretations or failure in data transfer does not result into a missing part of the final translation since the selection step can switch to a different source than the failed one. The method is thus more robust than currently known methods. Similarly, error made by the speaker or interpreter is less likely to appear in the final translations. Any drop in quality, error (human and/or technical) etc. in one source is much less likely to deteriorate the quality of the final translation when compared to known speech-to-text translation methods. Errors made by the systems (ASR and/or MT) are expected to balance each other out or compensate each other in the method so the text fed to the final machine translation(s) is likely to be of better quality or closer to the source speech than text from any individual source. The selection step is automatic, no human operator is needed for switching sources. Therefore, the selection can happen almost constantly, e.g., every second, every tenth of second etc. even for a large number of sources. This further improves the quality of the text fed to the final translation systems and thus of the final translations. The selection is also consistent, e.g., not affected by a current state of mind of some human operator. High quality translations can thus be provided even for languages for which no human interpreter is available or can be afforded.

Furthermore, the method of the invention can also provide transcripts of the speech in the source language or of the interpretation(s) in the interpretation language which are also of higher quality than the ones provided by the ASR systems. For this purpose, for languages other than the one common language, MT systems from the common language into the source or interpretation languages might be needed in the final translation step. All speech data, i.e., the source speech and the interpretation(s), can be processed by a single ASR system and a single MT system, or individual systems might be used, e.g., different for each language. No MT is necessary if the speech data is already in the common language. The speech data from a single source (speaker or interpreter) can also be processed by multiple parallel ASR and/or MT systems and thus form multiple sources for the selecting step. For example, the source speech can be transcribed by two different ASR systems, e.g., two neural networks with different architectures and/or trained on different datasets. Similarly, the interpretation data can be transcribed by two different systems, output of each of them can then be translated by the same or different MT system, or a single transcript can be translated by two MT systems etc. The number of sources for selection can thus be higher than the number of audio inputs into the method.

The predetermined time period for considering a source to be inactive can be for example 5-60 seconds, generally it can by any number chosen by a skilled person with regard to the systems used, the speech being translated, computing power, speed of data transfer etc. It can happen that all the sources are ruled out as inactive, i.e., they have not provided any data in the predetermined period, for example when the speaker makes a pause. In such cases, it is possible to keep a previously chosen most credible source as the currently most credible one, or the method can be adapted to choose no source as the currently most credible one. Therefore, in such a situation, it is possible to send no data to the system(s) for the final translation until some source becomes active. On the other hand, even when the speaker, i.e., the source of the source speech, makes a pause, the ASR or MT systems or the interpreters can still provide some output, as there might by some delay or some new translation/transcription updates of older parts of the speech.

The parameter N determining the length of time having impact on the automatic credibility score can also be any number chosen by a skilled person with regards to the systems used, the speech being translated, computing power, speed of data transfer and also with regards to specific criteria impacting the automatic credibility score in any given application. For example, N can be from 5 seconds to 300 seconds, preferably at least 30 seconds. Each criterion can then be evaluated on its own time period of M seconds, where $M \leq N$.

The method of the invention can by implemented e.g., on a personal computer, but also on a group of computers, on a computer and some remote server(s) etc. Especially the ASR and/or MT systems can be run using a cloud computing service. A main computing or processing unit can for example only receive source speech and the interpretations, send these data to be transcribed and/or translated, receive data from all the sources and perform the selection step. The data for the final translation might then again be sent to a remote server for the machine translation(s). The final translation(s) can then be presented to users e.g., via their respective user devices, such as smartphones connected to the Internet.

The step of selecting can be performed at regular time intervals, such as every 0.05-5 seconds, preferably 0.05-0.5 seconds. That means that after every such time interval, the automatic credibility score is computed, and the currently most credible source is chosen.

The step of selecting can also be performed after an output was provided a predetermined number of times by the sources. This number of times can be e.g., from 1 to 100.

Choosing 1, i.e., selecting every time a new piece of output is provided by any source, is preferable, but, depending on available computing power and number of sources, a larger number can be chosen. Output is generally a part of text provided by the source together, e.g., it can be several words or a sentence. For example, an ASR system can divide the speech into sentences according to pauses made by the speaker/interpreter and then output transcript of the speech in these sentences. Each sentence can then form an output. Some other systems can however output single words or multiple sentences etc.

Choosing the source language as the one common language might be preferable as there would be no need of translating the source speech transcript. Choosing one of the interpretation languages as the one common language can similarly be advantageous as it would also mean that one of the sources for selection does not require MT system. Other times, a pivot language might be preferable as the one common language, even if it is not any of the source and interpretation languages, as the final MT systems might provide better results when translating from e.g., English, German, French, or Spanish, because datasets for training in these languages are generally larger and more easily available. Any language can however be used as the pivot language. Similarly, the criteria for selection might be easier to define or perform on certain languages than on other languages, so the one common language might be chosen with taking the criteria into account.

The automatic credibility score of each given source from the remaining sources might be determined using at least one criterion selected from a set of criteria comprising:

- Uniformity of delays between times when outputs are provided by the given source;
- Length of sentences outputted by the given source in last M seconds;
- Number of words or characters outputted by the given source in last M seconds;
- Presence of characters not forming words or interpunction in output of the given source (e.g., in last M seconds or in last number of outputs, such as in the last output);
- Monitoring a predetermined grammar rule corresponding to the common language in output of the given source;
- Comparison of number of characters or words received in output of the given source and in output from at least one different source in last M seconds;
- Predetermined credibility weight given to the given source based on quality of the used automatic speech recognition system, the machine translation system, or the human interpreter;
- Semantic analysis of the output of the given source from last M seconds.

The criteria might be the same for all the sources, but they might also be different for different source languages, i.e., when grammar rules are used. Preferably the criteria used are of the same kind, i.e., while the specific grammar rules, language models, characters or time periods might be different, chosen with regard to any specific language, all sources are evaluated with criterion comprising a grammar rule, a language model, checking for some characters, checking uniformity etc., or with a combination of criteria of the same kind. It is however also possible to use completely different criteria for different sources, e.g., when defining criteria of the same kind for different languages is not possible or if it wouldn't be as effective or wouldn't provide scores comparable between different sources.

Each output or a piece of output from a source can comprise a newly translated or transcribed part of text, or updated translation or transcript of already outputted part of text. For some ASR and/or MT systems, it is also possible that only new parts of text are provided and are not further updated.

Some of the sources, for example each source, might further output the source speech data or interpreted speech data on which the text output of the source is based. The credibility score can then be partially based on an automatic acoustic analysis of the speech data. Indicators of low quality of the speech or of the audio data, such as presence of a noise, presence of multiple overlapping voices, loud background sounds etc., might then lead to lower score being given to the source in the selection step. Therefore, the quality of the sound recording, on which the source text is based, might have direct impact on the automatic credibility score and thus have impact on selecting which source is chosen as the currently most credible source.

As mentioned above, the group from which the currently most credible source is selected optionally further comprises at least one source outputting only audio data comprising the source speech or an interpretation. If this source is selected as the currently most credible source, its output is transcribed using an automatic speech recognition system before it is fed to the at least one machine translation system for the final translation. The criteria for this source are thus based on an automatic acoustic analysis. The automatic credibility score for this audio source is computed, unless it is inactive, and the score is compared with score of the other (text) sources. An audio source can also be ruled out e.g., when it is in a language for which no ASR or MT is available, when it is unintelligible, etc.

In some embodiments it is also possible to establish, in the selection step, that no translation is needed or possible. For example, if audio data comprising the source speech are sent to the selection step and a criterion determines that the source language is a language for which no interpreter is available and/or no ASR or MT is possible (e.g., if a speaker starts speaking in a language not expected when setting up the method), the method might stop providing the final translations until the source speech language changes. Similarly, if the source language is a language that every member of audience is expected to understand, no translation might be necessary, and the selection step might thus select no source as the currently most credible source for final translation or might select the audio source with source speech as the currently most credible source without sending it for further ASR or MT processing.

The method can further comprise the following steps:
- Receiving, in real time, video or image data comprising a real time sign language interpretation of the source speech. Therefore, one of the interpretation languages might be a sign language and thus a video feed might be one of the inputs of the method.
- Transcribing, in real time, the video data into text data using at least one automatic sign language recognition system. Such systems usually implement neural networks for the image recognition.
- Translating, in real time, the transcribed video data into the common language using at least one machine translation system unless the video data is transcribed directly into the one common language.

The group from which the currently most credible source is selected further comprises the source of the transcribed video data in the one common language. Therefore, the sign language interpretation is a basis for another source that can be selected as the currently most credible source at some point. This source provides text in the one common language and can thus receive the automatic credibility score based on the same or similar criteria as the other text sources.

The method of the invention can be realized by a group of software and/or hardware modules. E.g., an input module receives the source speech and the interpretation(s). A transcribing and translating module or several modules receive the input data and output the text data in the one common language. Each transcribing and translating module thus comprises at least an ASR and/or MT system and forms at least one source for selection. The data from all the sources can be stored in a memory, at least for N seconds, so that the criteria can be evaluated. After the method is initiated, before N second has lapsed, the criteria can be evaluated on a shorter time period for which outputs are available, a source can be selected randomly, a predetermined source can be selected etc. Optionally there are some processing systems for the audio data or for the transcribed and/or translated text. A selection module then computes the automatic credibility score for each source and selects one source. Data from this one source are then provided to a final translation module(s) until another source is selected in some subsequent selection step. The final translations are then provided to end users.

The object of the invention is also a computer system comprising means adapted for carrying out the steps of the method of the invention. This system can be e.g., a single computer. It can also comprise multiple computers or servers, e.g., connected via the Internet. The system can also comprise means for providing and transmitting the audio data and the text data. It can also comprise output device(s), e.g., personal computers of users, and it can comprise e.g., a mobile application or webpage allowing the users to at least select their desired final translation language and obtain the final translation.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
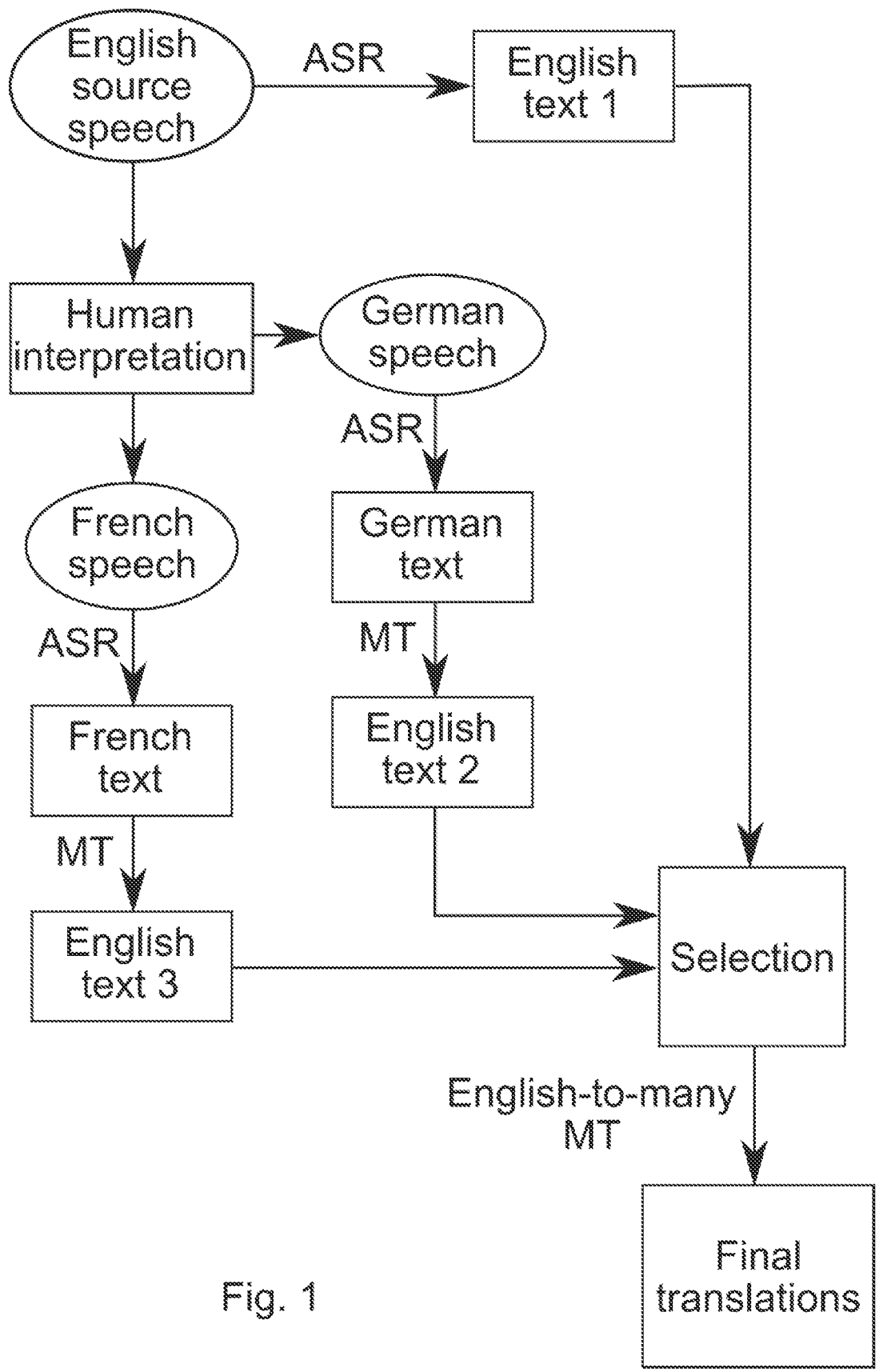
FIG. 1 shows a basic scheme depicting steps of the method according to claim 1 when the source language and the one common language is English.

The computer-implemented method of real time speech translation according to this invention is presented in the following embodiments.

The method of the invention comprises the following steps.
Real time receiving of audio signal or data, this data comprising a source speech or parts thereof. The source speech is in a source language.
Real time receiving of audio signal or data, this data comprising a human interpretation of the source speech into an interpretation language different than the source language. This data does not need to be synchronized with the source speech data, i.e., the translations, or more precisely interpretations as this step deals with spoken translation, can be slightly delayed with respect to the source speech as the human interpreters might be a few seconds behind the source speech they're interpreting. On the other hand, the source speech can at some point, e.g., in one of the subsequent steps of the method, be delayed with respect to the interpreted speech, e.g., because of a slower data transfer or a slower speech recognition.
Automatic speech recognition (ASR). In this step, the source speech data and the interpreted speech data are transcribed (also in real time) into text using an appropriate ASR system. A common system can be used for all languages in some embodiments. In general, it may be advantageous to use different systems for different languages. This step is advantageously performed separately for each speech, i.e., for the source speech and each human interpretation. The result of this step(s) is therefore text data in several languages, one of which is the source language. This text can be outputted from the ASR system(s), e.g., as separate words, several words, whole sentences etc., depending especially on a specific implementation of each system and possibly also on given language(s), proficiency and articulation of given speakers or interpreters, quality of sound recording etc.
Real time translation of the text data from ASR into one common language using at least one machine translation (MT) system. Preferably, this step is also done separately on each transcript resulting from the previous step. The common language might be one of the source or interpretation languages, in which case one of the transcribed texts does not need to be translated in this step. It is however also possible to translate each transcript. The output of this step, or these steps when done separately for each used language, is therefore text data in the one common language provided from different sources, wherein a source is an MT or ASR system outputting text in the common language. Sources thus might comprise an ASR system (not followed by MT) and all the MT systems, or only the MT systems if source language or any interpretation language is not the common language. If one of the human interpretation languages is the common language, transcript of this translation does not need to be modified in this step or does not need to pass through this step, similarly if the source language is the common language. Source output however might be modified, prior to selection, even if not translated, e.g., spelling errors might be corrected, interpunction provided etc.
Repeated selection of a currently most credible source from the sources providing text data in the common language. The selection is done on basis of the output text from the previous step, e.g., on all the data provided by the sources in some predetermined period of N seconds, e.g., 60 seconds. This step might be performed regularly, e.g., every 1 second or every 0.1 second etc. It might also be triggered every time some source provides an output or after some number of outputs from the sources. In this step, an automatic credibility score is assigned to each active source, while inactive sources, e.g., sources that have not provided any output in some predetermined period of time, might be ruled out right away and not considered when selecting the currently most credible source. The score might be based on various criteria which will be described in more detail below. The source with the highest automatic credibility score is used in the next step. If several sources have the same best score, one of them might be selected randomly. If one of them was selected as the currently most credible source in a previous instance of this selection step, it might be chosen in this step too, in order to avoid changing of source whenever possible. The source selected in the last instance might also automatically receive a better score in order to avoid changing sources when their quality is similar. In some embodiments, the currently most credible source is selected from a group of sources comprising not only the above-described ASR and MT systems, but also at least one source of audio data comprising the source speech or one of the interpretations. For example, audio data from one of the interpreters can be sent directly to the selection step. Such a source might need different criteria than the text sources, e.g., sound recording quality can be determined, presence of sounds not forming any words can be checked for, number of words can be counted, semantic analysis can be performed etc.

Providing final translation(s) into at least one language different from the source language and any of the translation languages. It is also possible to translate into a language that is the source language or one of the translation languages, e.g., in order to provide a transcript of the speech or human interpretation which might be of higher quality then the one provided by ASR in the ASR step. MT systems from the common language to the final translation languages are used in this step. They might be the same or similar MT systems used in the translation step preceding the selection, and they might also be different MT systems. The final translations are preferably provided to the end users in real time, e.g., they are sent to their user devices via a web client as soon as given MT system considers a part of translation to be final. In some embodiments the final translation might also be updated even after sending it to the users when the systems finds a better translation for a given part of the text.

As this method provides a real time translation, most of the time all the steps or most of them might be performed simultaneously on potentially different parts of speech or text. For example, a source might already be selected as the currently most credible source in the selection step while the final translations are being provided, at the same time, from slightly older data from some previously most credible source. Each source of speech data, i.e., both the data of the source speech and of the speech translation(s), is advantageously processed separately and they are only considered together once they are provided to the selection step in the form of the text in the common language. For example, the speaker providing the source speech might be a few words or sentences ahead of the human interpreters. Therefore, the ASR for the source speech might also generally be ahead relative to the ASR for the speech interpretations but it is delayed relative to the source speaker as the ASR might need some time to process the speech or might need more context, e.g., several words or a whole sentence, before it can provide a reasonably accurate output text. Similarly, the different MT systems or even the same system translating from different languages can also delay some parts of the speech more than others or some languages more than other etc. The output from the MT can also be updated multiple times, each update provided as a separate output data, as the meaning of a part of text might become clear only with other parts of the speech provided to the system and the meaning can have significant impact on the translated output.

As a result of this potential delays, the selection step might receive corresponding parts of the common language text from different sources at different times. The impact on the data being fed to the MT systems for providing the final translation is however very limited as most instances of the selection step select as the currently most credible source the same source as a previous instance. Therefore, while it may occur that a part of the speech is repeated in the text fed to final translation step or is missing from this text, it is a rare occurrence with generally insignificant impact on the quality of the final translation(s).

The form of output from each source that is considered for selection in the selection step depends on the used MT or ASR system. For example, each output can be a transcribed or translated part of text not previously outputted by the source, it can be a transcribed or translated part of text which was previously outputted by this source but for which the system has created a better translation/transcript (better based on some criteria inherent to this system), or it can be a combination of both, i.e., several words outputted for the first time and several words for which a better translation was found with the context provided by the new words. In general, each output can be a set of words, preferably non-empty, a sentence or a part of sentence etc. Some systems, especially based on neural networks, might also sometimes output nonsensical group of characters, e.g., nonexistent words, one word or syllable repeated over and over, group of special characters etc. Preferably, the selection step can deal with such nonsensical outputs and rule such a source out until it starts outputting sensible text again.

There might be a processing step provided between the ASR and MT systems, or after the ASR system when it is not followed by MT. In this processing step, the ASR output can be converted into more standardized text by e.g., following a grammar rule. For example, a proper punctuation or capitalization can be ensured by a neural network system. Multiple ASR systems for the same language (source or interpretation language) can be used in parallel. One stream of audio data can then be basis for multiple transcribed texts and subsequently, after each text is individually translated, can provide multiple sources for selection. One transcribed text can also be translated in parallel by multiple MT systems, again forming multiple sources for selection. This approach might further increase the quality of the final translations, especially if the number of interpreters is lower.

The criteria that might be considered when determining the automatic credibility score for each active source might be defined without regard for or knowledge of what language is the common language or what languages are the source and translation languages. That is, some criteria can be used for all languages. Such a criterion might, for example, measure uniformity of delay between outputs from each source, wherein more uniformly outputting source receives a higher (that is better) score. Uniformity might be measured for outputs received in the selection step in the last M seconds, where M is e.g., 10 sec, 20 sec, 60 sec, 2 minutes etc. For example, the score received according to this criterion might be inversely proportionate to the longest delay between two consecutive outputs received from given source. As another example, the score might be either 0 or 1 based on the following system:

If there are too few data to decide=less than 6 received outputs in last 60 seconds=>consider this source, but with score 0 (=lower priority)

decide, whether the sources are "uniform":

n=3 split updates in last 60 seconds to two groups: A=all but the last n updates; B=last n updates;

a=average time between updates in group A m=maximum time between updates in group if m>5*a: The updates are non-uniform=>rule this source out else: The updates are uniform=>consider this source, with score 1 (=higher priority)

Subsequently, if more than one source is remaining, the automatic credibility score can be affected by another criterion. For example, by checking length of sentences outputted from each given source in last M seconds, where M is for example 50 or 60 seconds. Too short or too long sentences in a source are generally a symptom of incorrect punctuation and sentence segmentation and this has a bad impact on machine translation quality. Therefore, each source might receive some (e.g., 0.5) penalty points for each sentence having less than ten characters and for sentences longer than a hundred characters (e.g., 1/100 of number of characters penalty points). Generally, parameters n and M, as well as the time periods used or number of outputs forming too few data, might be chosen differently. Similarly to length of sentences, number of characters or words outputted in the last M seconds, where M might be the same or different than M chosen for sentence length, might be checked and compared to an expected number of words or characters in a speech (possibly chosen specifically for the common language).

Subsequently the source or one of the sources with the highest score might be selected, or another criterion might further impact the score of each source that has not been ruled out. In some embodiments, the automatic credibility score can be defined such that the lower score is better. In such embodiments, the source with the lowest score is selected.

Other criteria that might be used regardless of the actual languages might be e.g., a presence of special characters or combination of characters which are not expected in any speech transcript in the output of a given source, e.g., presence of words formed by repeating of a single character or syllable, or by combing a large number of non-alphanumeric characters. Some special characters or character combinations can appear in the text, e.g., because a programming errors, and a criterion can be used to check for these appearances. Another criterion might use a predetermined credibility weight given to a source based on quality of the used automatic speech recognition system, the machine translation system, or the human translator. For example, if it is known that one ASR or MT system generally provides more accurate results that another system used in the method, this more accurate system might always get some extra point to its automatic credibility score at the beginning of the selection step. Similarly, the human interpreters might be labeled as more or less credible by a human operator before the method is initiated or by a computer, based on e.g., historical credibility of transcripts of their translations from previous runs of the method, on whether the interpreter is a native speaker, on number of years the interpreter has been working as an interpreter, etc. Any source based on interpretation provided by a more credible human interpreter can then receive extra score points in the selection step.

Other criteria might be used which are defined with regard to the specific language chosen as the one common language and/or on the specific source/interpretation language. Such criteria might e.g., check whether the outputted language is indeed the one common language, check a predetermined grammar rule, such as presence of spaces between words, capitalization of some words or ratio of capitalized words to uncapitalized etc. Advanced language models can be used, e.g., one able to understand the topic of the text and compare it to an expected topic of the source speech. Spellcheck might also be used as a criterion. Switching between formally and informally addressing the audience might be used as an indicator of less credible source. For sources comprising an MT system, an expected ratio of number of words in the input language to number of words in the output (the one common) language might be known. The difference between this expected ratio and an actual ratio in the outputted text from last M seconds might be used for adjusting the automatic score of the sources. Another criterion might check whether a proportion of certain words or characters outputted by any given source in last M seconds relative to all outputted words or characters in that time is not too far from the expected number of words/characters for the one common language. For example in English, the letter E might be expected to form about 13% of some text, while for A it is about 8%, etc., and a source providing text with character ratios closer to these percentages might receive a better score.

When more than two sources are used and more than two remain after the removal of inactive ones, or after any potential previously applied criteria, the sources might be compared to each other, e.g., with respect to length of the text outputted in the last M seconds. Number M might be different for each criterion where it is mentioned, e.g., it might be 10 when counting characters, 60 when comparing sources, and 400 when applying a semantic language model to determine a topic of the text. M might be chosen large enough to cover all the outputs provided since the method was started. Any source where the number of words, sentences and/or characters is an outlier with respect to all the other ones or most of them might then by ruled out from the current selection or can receive some penalty points for its score. If the sources are compared to each other, they might advantageously have different weights in this comparison. E.g., a source considered more trustworthy might have larger weight when computing a weighted average of text lengths for all considered sources. The length of text of each source is then compared to the average and any source too far from the average is considered an outlier. In embodiments where the ASR or MT systems used provide a confidence for their outputs, this confidence can also be used as a criterion for the automatic credibility score. It may sometimes occur, that after the removal of currently inactive sources, no source remains to be selected. In such a case, there may be no output from the selection step and therefore no final translation might be provided until at least one source becomes active. This situation might be e.g., a result of pause in the speech, but it might also be caused by a faulty transmission of data, error in the ASR or MT systems etc.

Apart from the text data, each source can also output the speech data it is based on, i.e., the source speech or the interpretation audio signal/data. That is, the source that is outputting transcript of the source speech or its machine translation can be complemented by the source speech data, the source providing a machine translation of a transcript of a human interpretation, or only its transcript, can be complemented by the interpretation audio data, etc. The automatic credibility score can then reflect the quality of the speech. Therefore, the currently most credible source is selected not only based on the outputted text quality but also based on quality of the sound recording, presence of background noise, intelligibility of the interpreter or speaker, silence in the recording, overlapping voices, etc. Any method of automatic acoustic analysis of the speech/interpretation data can be used.

Preferably, so called re-translating ASR and MT systems are used. These systems output hypotheses comprising transcribed or translated text from some time period. These time periods can be numbered so that it is apparent whether any output is a new transcript/translation or an update of a previous one. Any output or piece of output can also comprise information stating whether the source system considers this output complete, i.e., it will not be updated anymore, incoming, e.g., part of an unfinished sentence, or expected, which is an output that can be complete but can also be incoming. The method of the invention can make use of this information, but it might also operate without it. So called streaming ASR and/or MT systems can also be used in the present invention. These systems provide only final outputs which are not further updated.

In various embodiments any possible combination of the above-described criteria can be used and each of the text-based criteria can also be used on its own to determine the automatic credibility score. Preferably, two or more criteria are used to provide more reliable score.

The setup, i.e., the hardware, especially a computer system, for running the method of the invention might comprise a personal computer or a server or some other processing unit provided with a memory with program instructions which cause the processing unit to perform the method. Input to the processing unit might be provided by several microphones, one for the source speaker and others for the interpreters. The processing unit might be also equipped with appropriate ASR and MT systems stored in the memory, or it might receive its input already in the text form, possibly already in the one common language. The transcripts and machine translation can thus also by provided by other servers or processing units, e.g., one processing unit can run all the ASR systems, other can run all the MT systems and a main processing unit that performs the selection step. For example, the selection step might be performed by a main processing unit, such as a personal computer, which receives the audio speech data, sends it to some remote server(s) for automatic speech recognition and machine translation, and receives, in real time the text data in the one common language. The sources to be selected can all be realized by one system providing ASR and/or MT from multiple languages or they can be provided by individual servers. The main processing unit then selects one source to be translated based on some predetermined criterion for establishing an automatic credibility score. The final translations can then be provided by the same processing unit, e.g., the main one, they can each be provided by an individual processing unit or server, etc. The translations might be provided e.g., as a video feed on multiple output screens, e.g., they might be sent via the Internet to multiple remote users, each selecting their preferred final translation language.

In an exemplary embodiment schematically depicted in FIG. 1, the source language and also the one common language is English, and two human interpreters are provided, one interpreting to German, the other to French. Three ASR systems are provided, one for each of the three languages. For example, the Mozilla DeepSpeech engine can be trained on an appropriate dataset and used as an ASR system. The French and German texts are being translated by a French/German to English MT. That is, as soon as any output, i.e., any part of text in the given language, is provided by the ASR, this part of text is sent to the MT system and translated. For example, the Marian framework can be trained on appropriate datasets and used as an MT system. Three English texts are therefore being provided as outputs from three sources (English ASR, French to English MT, German to English MT) in real time, possibly with some delay, into the selection step, which is automatically triggered every 0.1 seconds.

The selection criteria might be for example the uniformity criterion followed by the length of sentences criterion as described in detail above. The currently most credible source is then selected as the source with the highest automatic credibility score. If two or more sources have the same highest score, the previously selected source from the previous selection instance is selected, if possible, and otherwise the source is selected randomly. The output from the currently most credible source is then sent to another MT system(s), e.g., to three different systems for translation from English into Italian, Spanish and Swedish. Three texts in these three final translation languages are therefore provided from the method.

In other embodiments, there might be provided only one interpreter or a larger number of interpreters, e.g., ten or twenty. The one common language might be different from the source language and also from all the interpretation languages. The criteria might be selected as any possible combination of the above-mentioned criteria or any other criteria that can be readily provided by a skilled person. The output from the method might be not only the final translation(s) but also the transcripts of the speech or interpretation(s) or their translation and/or by transcript formed from outputs of the currently most credible source.

Figure 2:
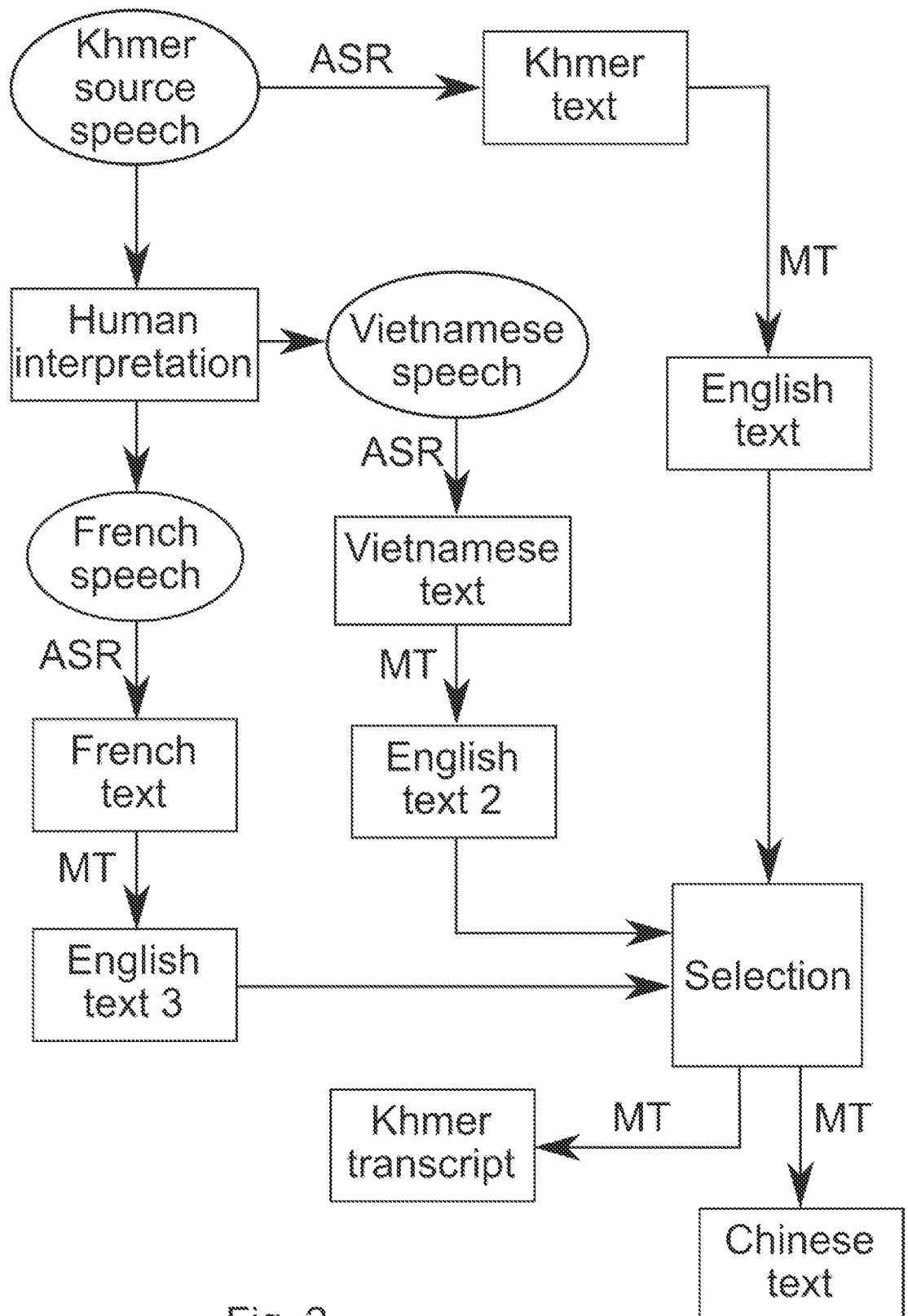
FIG. 2 shows a scheme depicting another embodiment of the method of the invention where the one common language is different from the source and interpretation languages.

The present invention might be most advantageous in situations where the source speech is in a less common or widespread language for which ASR and MT systems might be less advanced then e.g., between English and German, where there are large quantities of relatively easily available training data. FIG. 2 illustrates an embodiment of the present invention suitable for such a situation. The source language in FIG. 2 is Khmer and human interpreters are only available into Vietnamese and French. Since defining criteria for Khmer and then obtaining MT systems from Khmer to other languages might be difficult, English was chosen as the one common language. All three speeches are thus machine translated into English, the automatic credibility score is evaluated for the English sources and the final translations are then provided, e.g., into Chinese. A Khmer transcript is also provided from the final translation step as the Khmer ASR might be oftentimes less reliable then e.g., transcribing and translating the French interpretation. Similarly, an English transcript might also be provided, put together from the outputs from the currently most credible sources.

In another advantageous embodiment, the method can be realized e.g., as described above, but it further receives image or video data comprising a sign language interpretation of the source speech. This data can be transcribed using appropriate automatic sign language recognition system and the resulting text, possibly after machine translation into the common language, can be part of the group of sources from which the currently most credible source can be selected. Thus, the quality of the final translation(s) can be further improved by providing another source. Since this source is based on image data, not audio data, it might be resistant to some errors, e.g., a loud background noise, making audio sources unintelligible.

In another advantageous embodiment, the method can be realized e.g., as in any embodiment described above, but the group from which the currently most credible source is selected further comprises at least one source outputting only audio data comprising the source speech or an interpretation. If this source is selected as the currently most credible source, its output is transcribed using an automatic speech recognition system before it is fed to the at least one machine translation system. It might firstly be translated into the one common language and then translated by the MT systems for final translations. Preferably, the speech data (source speech or interpretation) which corresponds to this audio source is not transcribed prior to selection, i.e., it does not provide basis for any text source. In this way, the computational power needed for ASR and possibly MT can be saved, and ASR is only done if the source is selected. Preferably, an audio source is used for languages where a high-quality ASR output is expected. In cases where the ASR system is considered likely to make mistakes in the transcription, it is preferable to transcribe prior to the selection, so that if such a mistake is made, this source is less likely to be selected.

Figure 3:
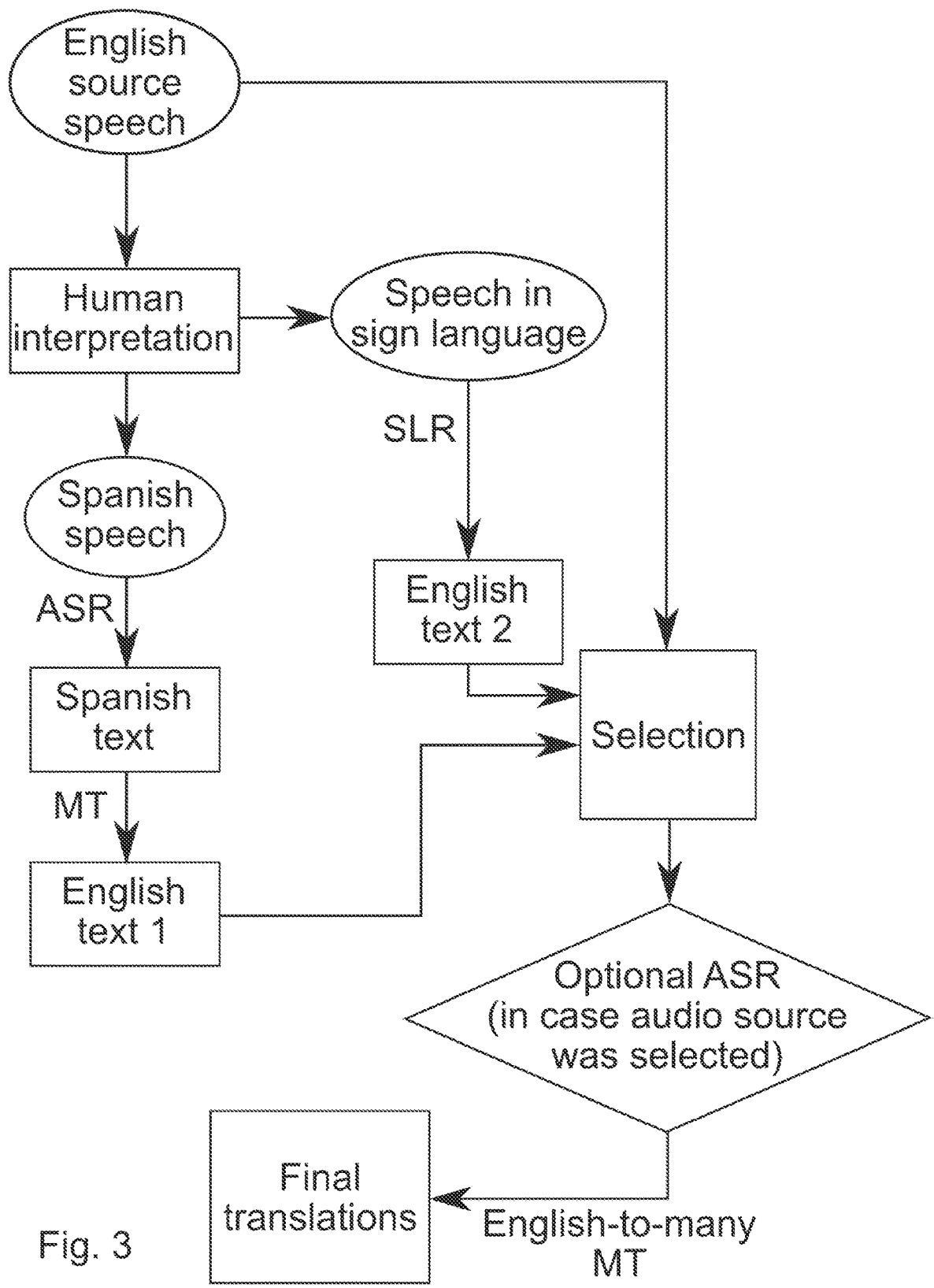
FIG. 3 shows a scheme depicting another embodiment of the method where one of the sources for selection provides audio data and another is based on sign language interpretation.

Such a method is illustrated in FIG. 3, where the source language is English and the group of sources for selection comprises an English audio source (source of the source speech), an English text source based on Spanish interpretation and an English text source which is an automatic sign language recognition (SLR) system. The audio source can be given the automatic credibility score e.g., based on audio quality. For example, presence of background noise can lead to penalty points. Number of words can be counted in the audio similarly to the word counting text criterion above. Uniformity of outputs can be measured similarly to the embodiment described above, etc. For the two text sources, any of the above given criteria or any combination thereof can be used, or some other criteria can be used. The source with the best score is then selected, e.g., every time an output from any source is received, and if the audio source is selected, an English ASR is applied to the audio output. Finally, an MT algorithm is used to obtain the final translations. An English transcript formed from all the outputs from the currently selected sources can also be obtained, e.g., to complement a video feed of the sign language translation as subtitles.

The method of the invention is mainly intended for use at conferences, lectures, and similar events, to provide a real time translation into languages for which no human interpreters are available. It might for example be implemented into a video conferencing software or into a sound system for a conference hall In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A computer-implemented method of real time speech translation comprising the following steps:

Receiving, in real time, input data comprising a source speech in a source language;

Receiving, in real time, interpretation data comprising a real time human interpretation of the source speech into at least one interpretation language different from the source language;

Transcribing, in real time, at least part of the input data and at least part of the interpretation data into text data using at least one automatic speech recognition system;

Translating, in real time, the text data into one common language using at least one machine translation system;

Selecting repeatedly, based at least partially on the transcribed input data and the transcribed interpretation data translated into the common language, a currently most credible source of data, wherein the currently most credible source is selected from group comprising the machine translation systems and speech recognition systems providing text data in the common language;

Feeding data from the currently most credible source into at least one machine translation system for real time translation into at least one language different from the source language and different from the at least one interpretation language; and Obtaining, in real time, at least one translation of the data outputted from the currently most credible source;

wherein in the step of selecting, sources that have not provided any text data in a predetermined time period are ruled out from the current selection, current automatic credibility score of each of the remaining sources is determined based on outputs provided by each source in last N seconds, and the source with the best automatic credibility score is selected as the currently most credible source.

2. The method according to claim 1 wherein the step of selecting is performed at regular time intervals.

3. The method according to claim 1 wherein the step of selecting is performed after an output was provided a predetermined number of times by the sources.

4. The method according to claim 1 wherein the one common language is the source language.

5. The method according to claim 1 wherein the automatic credibility score of each given source from the remaining sources is determined using at least one criterion selected from a set of criteria comprising:

Uniformity of delays between times when outputs are provided by the given source;

Length of sentences outputted by the given source in last M seconds;

Number of words or characters outputted by the given source in last M seconds;

Presence of characters not forming words or interpunction in output of the given source;

Monitoring a predetermined grammar rule corresponding to the common language in output of the given source;

Comparison of number of characters or words received in output of the given source and in output from at least one different source in last M seconds;

Predetermined credibility weight given to the given source based on quality of the used automatic speech recognition system, the machine translation system, or the human interpreter;

Semantic analysis of the output of the given source from last M seconds.

6. The method according to claim 1 wherein each output from a source comprises a newly translated or transcribed part of text or updated translation or transcript of already outputted part of text.

7. The method according to claim 1 wherein each source further outputs the source speech data or interpreted speech data on which the text output of the source is based, wherein credibility score is partially based on an automatic acoustic analysis of the speech data.

8. The method according to claim 1 wherein the group from which the currently most credible source is selected further comprises at least one source outputting only audio data comprising the source speech or an interpretation, wherein if this source is selected as the currently most credible source, its output is transcribed using an automatic speech recognition system before it is fed to the at least one machine translation system.

9. The method according to claim 1 wherein it further comprises the following steps:
   Receiving, in real time, video data comprising a real time sign language interpretation of the source speech;
   Transcribing, in real time, the video data into text data using at least one automatic sign language recognition system;
   Translating, in real time, the transcribed video data into the common language using at least one machine translation system if the video data is not transcribed into the one common language;
   wherein the group from which the currently most credible source is selected further comprises the source of the transcribed video data in the one common language.

10. A computer system comprising means for carrying out the steps of the method according to claim 1.

\* \* \* \* \*